United States Patent [19]

Prestridge et al.

[11] Patent Number: 4,702,815
[45] Date of Patent: Oct. 27, 1987

[54] DISTRIBUTED CHARGE COMPOSITION ELECTRODES AND DESALTING SYSTEM

[75] Inventors: Floyd L. Prestridge, Sapula; Bruce C. Johnson, Broken Arrow, both of Okla.

[73] Assignee: National Tank Company, Tulsa, Okla.

[21] Appl. No.: 859,568

[22] Filed: May 5, 1986

[51] Int. Cl.[4] ..................... C10G 33/02; B01D 17/06
[52] U.S. Cl. .................................. 204/302; 204/190; 204/290 R
[58] Field of Search ........... 204/188, 190, 275, 290 R, 204/294, 302, 305, 306, 307, 308

[56] References Cited

U.S. PATENT DOCUMENTS

| | | | |
|---|---|---|---|
| 3,592,752 | 7/1971 | Pfeifer | 204/188 |
| 3,645,880 | 2/1972 | Ueda | 204/278 |
| 3,649,516 | 3/1972 | Cole, Jr. et al. | 204/302 |
| 3,661,746 | 5/1972 | Lucas | 204/188 |
| 4,118,294 | 10/1978 | Pellegri | 204/129 |
| 4,126,537 | 11/1978 | Prestridge | 204/302 |
| 4,133,738 | 1/1979 | Will | 204/294 |
| 4,204,934 | 5/1980 | Warren et al. | 204/186 |
| 4,308,127 | 12/1981 | Prestridge | 204/302 |
| 4,374,724 | 2/1983 | Robinson | 204/302 |
| 4,469,582 | 9/1984 | Sublette et al. | 204/302 |

Primary Examiner—John F. Niebling
Assistant Examiner—William T. Leader
Attorney, Agent, or Firm—William W. Habelt

[57] ABSTRACT

A system for removing brine from oil well production (12) in which fresh water (50) or less saline water (50) is passed in counterflow to the oil well production (12) through electric fields established between a plurality of composite electrodes (26). The electrodes (26) are of a laminar construction having a centrally located conductive member (30) surrounded by an electrically nonconductive region (28). With a nonmodulated voltage supply (144) connected to conductive member (30) a plurality of electric fields, some having uniform gradient and others having nonuniform gradient, are established between adjacent composite electrodes (26) in the direction of flow of both the oil well production (12) and the dilution water (50). Composite grids (26) have an inherent current regulating characteristic that reduces the tendency for arcing and suppresses sustained arcing should an arc occur.

10 Claims, 7 Drawing Figures

DISTRIBUTED CHARGE COMPOSITION ELECTRODES AND DESALTING SYSTEM

BACKGROUND OF THE INVENTION

This invention relates to electrostatic separation processes and in particular to a method and apparatus for repeatedly disbursing and coalescing a relatively polar fluid in a relatively non-polar fluid by passing a stream of the polar fluid in counterflow to the direction of flow of the non-polar fluid through an electric field of varying electric field gradient established by a plurality of composite electrodes.

Separation processes utilizing high voltage electric fields include solid-solid separation in the benefaction of ores, solid or liquid separation from a dielectric liquid, and the use of electrostatic precipitators to remove solid or liquid particles from exhaust gases and air conditioning systems. The electrostatic field utilized in these separation processes is generated by applying an alternating current voltage, a direct current voltage, or some combination thereof, to a grid within the process flow.

When the liquid-liquid separation removes water from an oil-water emulsion in an electrostatic dehydrator, the oil being a non-polar fluid acts as a dielectric and water droplets being polar are coalesced. Coalescense occurs when small water droplets collide and unite to form larger water droplets. Water droplets are coalesced by establishing an electric field between electrode elements and passing the oil-water emulsion through the electric field. Since water is slightly polar, the droplets become further polarized by the electric field. The polarized droplets are attracted to each other and move into coalescense with each other. The larger droplets gravitate to the bottom of the dehydrator where the water is removed. The dehydrated oil moves upward and is removed from the upper portion of the dehydrator.

Small water droplets have a low settling velocity and, therefore, gravitate slowly or are carried along with the through flow. It is desirable to cause small water droplets to coalesce to form larger water droplets, since the larger water droplets gravitate more readily. Small water droplets, however, are more difficult to move through oil and, therefore, require a greater electric field gradient to coalesce. Specifically, to coalesce small water droplets, an intense electric field gradient such as is achieved when a high voltage is applied to electrode elements is required.

Typical desalting requirements are to reduce the salt or brine content of oil well production to one pound of salt per 1,000 barrels of oil. The salt is normally contained within the brine produced in the oil well production. Removing the water removes most of the salt. However, some very small brine droplets remain with the dehydrated oil which can result in an unacceptable level of salt as high as 20 to 30 pounds per 1,000 barrels of oil. Therefore, fresh water, or less salty water is added to contact and dilute the brine remaining in the dehydrated oil well production followed by another stage of dehydration. If the water content is reduced to the same water content of the emulsion after the initial stage of dehydration, the salt content of the dehydrated oil after the second stage of dehydration is also lowered.

Electrodes in prior art dehydrators have been constructed of electrically conductive materials, typically metals, which instantly transport the applied charge to all surfaces of the electrode system, limited only by the power source supplying energy thereto. When these systems are operating without arcing, very little energy is required to sustain the electric field between electrode elements. However, when arcing occurs, a large amount of energy is consumed. Furthermore, even though the arcing occurs at only one location on a highly conductive electrode plate, the electric field collapses over the entire electrode, thereby terminating the dehydration process until the arcing is quenched. To rapidly detect the existence of arcing, quench the arcing and restore the potential on the electrodes, thereby re-establishing the electric field gradient, elaborate control systems have been utilized, such as the voltage control system disclosed in U.S. Pat. No. 4,400,253.

Further disadvantages of the prior art metal electrodes resides in that the full potential applied to the electrode, due to the conductivity of the electrode plates, exists on all edges, corner and points of the electrodes, as well as on electrode support apparatus. This results in the generation of many distorted fields and point charges. Distortions in the electric field and point charges produce high electric field gradients which limit aqueous droplet growth and cause droplet dispersion. When these dispersal mechanisms exist in areas where the process fluids are exiting the electric field, the aqueous droplets generated are not coalesced and, therefore, are carried out with the processed organic stream, such as dehydrated oil.

The more conventional forms of desalting, both for field and refinery processes, utilizes the addition of dilution water, either fresh water or less saline water, to once dehydrated crude oil emulsions. The emulsion, along with the dilution water, is then flowed concurrently through a mixer to increase the probability of the disbursed brine contacting and coalescing with the dilution water. The crude oil stream is then dehydrated again. Removal of the diluted brine is not complete and the salt removed is limited to the fraction of dilution water volume times the mixing efficiency. Frequently, multiple stages of desalting are required to meet salt specifications. Such a multiple stage dehydrator in a single vessel is disclosed in U.S. Pat. No. 4,149,958.

Yet another multiple stage dehydrator is disclosed in U.S. Pat. No. 4,308,127 which teaches passing an emulsion through a series of electric fields to coalesce a polar disbursed phase with the final electrostatic field decreasing by virtue of uniformly charged electrodes physically diverging. The emulsion from which almost all of the polar disbursed phase has been removed is passed through the decreasing electric field as the last step in coalescing the polar disbursed phase.

Application Ser. No. 385,349 assigned to the same assignee as the present application, the disclosure of which is hereby incorporated by reference, discloses a countercurrent dilution water flow system coupled with electrostatically mixing the dilution water with the brine inherent in oil well production. An electrostatic mixer-separator having a plurality of uniformly spaced, substantially parallel conductive electrode plates in which the voltage applied to the electrode plates is modulated becomes the equivalent of an efficient multistage mixer/coalescer/separator. The modulated power supply is employed to repetitively, sequentially vary the electric field gradient between adjacent electrode plates in a predetermined manner to achieve periods of increasing electric field gradient for disbursing the dilution water, sustained high electric field gradient for mixing the disbursed dilution water with the brine, thereby increasing the probability of contacting and diluting the brine, followed by reducing electric field gradient for maximum coalescing of the diluted brine. The modulating controller has the capability to detect arcing, and in response thereto, reduces the voltage applied to the electrodes for a sufficient time to quench the arcing then restore the voltage applied to the electrodes to reestablish the electric fields therebetween. During the time of arcing and reduced voltage, the disbursing, mixing and coalescing process ceases. Although the countercurrent dilution water system described above is superior to previous dehydration systems, it is still sensitive to high inlet brine concentrations or high dilution water rates.

What is needed is a method and apparatus for separating brine from an oil emulsion in which arcing will not occur, which would be free of distorted fields and point charges, and would subject the oil well production to an increasing electric field intensity to coalesce and remove relatively large droplets, followed by a high electric field intensity to coalesce small water droplets followed by a decreasing electric field to reduce the shear forces to which the coalesced water droplets are exposed in the exit area to minimize droplet carryover. Such a method and apparatus would further have a counterflow of dilution water which is disbursed and mixed with the emulsion in the high electric field, thereby increasing the possibility of contacting and diluting the remaining brine followed by coalescense for removal.

SUMMARY OF THE INVENTION

The present invention provides a method and apparatus providing a fresh water stream passing in counterflow to the direction of an emulsion through a dehydrator in which in a single pass through the dehydrator the emulsion is subjected to the equivalent of an efficient multi-stage mixer/coalescer/separator in which a non-modulated voltage is applied to electrodes in the dehydrator. The electrodes are of a composite electrode design such that what may be considered a single electric field having regions of varying electric field gradient or a multiplicity of electric fields exist in the direction of flow of both the emulsion and the dilution water.

DESCRIPTION OF A PREFERRED EMBODIMENT

Figure 1:
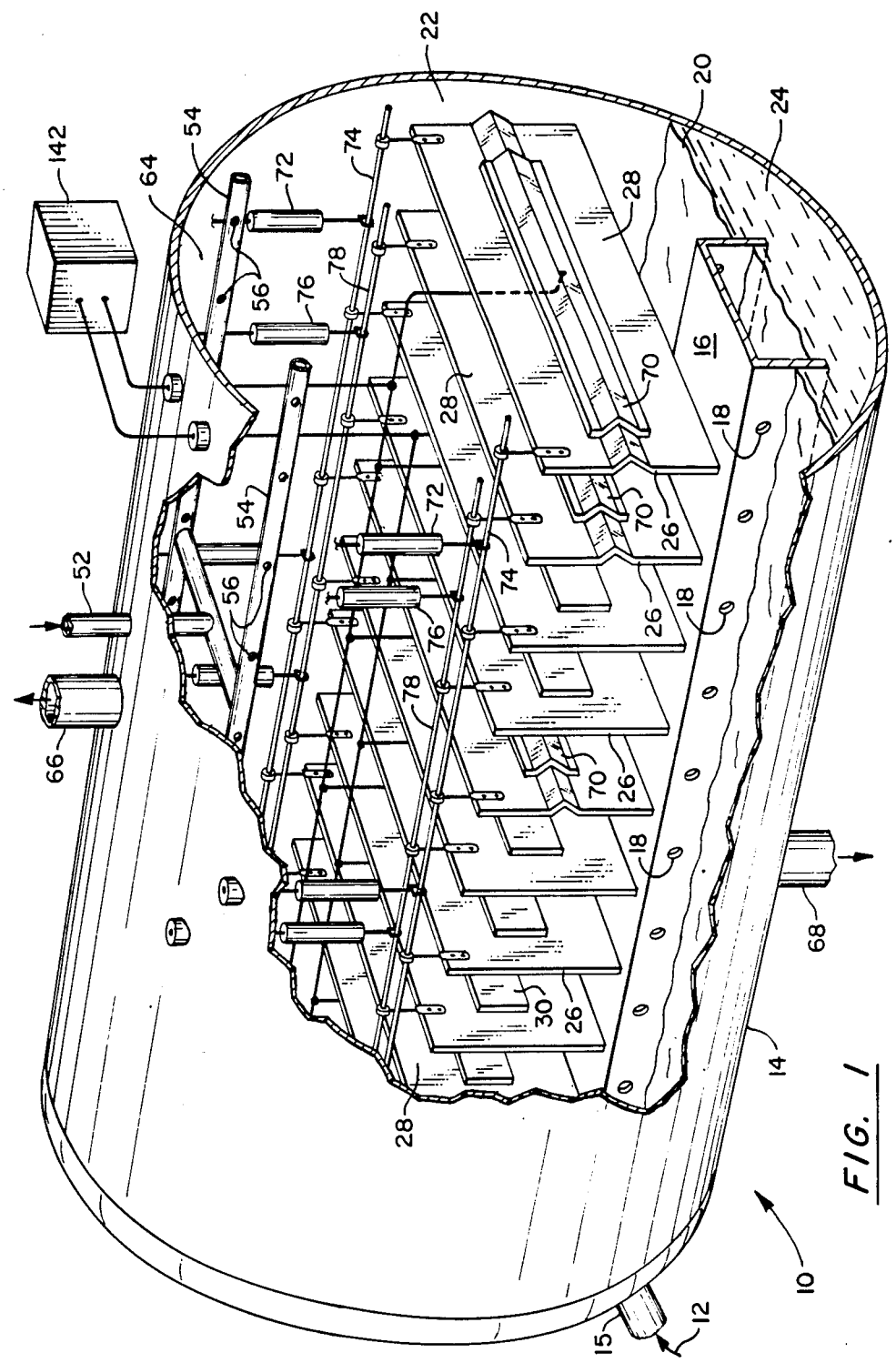
FIG. 1 is a perspective view, partly in section, of a dehydrator comprised of a horizontally elongated vessel containing suspended composite electrodes designed in accordance with the present invention.

Referring to the drawing, initially to FIG. 1, there is depicted therein an oil dehydrator 10 designed in accordance with the present invention. This invention transfers a contaminant between one or more relatively non-polar fluids and one or more relatively polar fluids, with the polar and non-polar fluids immiscible in each other. These contaminants include at least sodium chloride (salt) solids and metal ions. The following preferred embodiment of the invention transfers a contaminant originally present in the non-polar fluid to the polar fluid. In the preferred embodiment, the disbursed polar fluid is brought into contact with a contaminant of the relatively non-polar fluid to unite with the contaminant and droplets of the united contaminant and polar fluid then coalesce for removal from the relatively non-polar fluid. In the preferred embodiment, the polar fluid is water, the non-polar fluid is oil and the contaminant is sodium chloride.

There are two basic dispersal mechanisms involved when electric fields are utilized to mix immiscible fluids, that is to make an emulsion. Firstly, the hydrodynamic forces to which aqueous droplets are exposed within an electric field impose shear forces which cause individual droplets to shear into smaller droplets. Secondly, when the surface charge on a given droplet size reaches a critical gradient, electrodynamic forces will cause the droplet to disperse into smaller droplets seeking more surface area over which to spread the charge. Both hydrodynamic and electrodynamic forces operate to establish a mean aqueous droplet size within an electric field, the size of which is dependent on the electric field gradient.

Oil well production 12 comprised of a crude oil-brine emulsion enters housing 14 through oil inlet 15. Housing 14 is typically an elongated, horizontal cylindrical vessel having closed ends. Oil well production 12 is distributed along the length of housing 14 beneath spreader 16 and disbursed through orifices 18 in the vicinity of oil-water interface 20, which forms between emulsion 22 being processed and body of water 24. Water is automatically drawn off body of water 24 through water outlet 68 to maintain the level of interface 20. Oil well production 12 flows upwardly becoming emulsion 22 being processed, passing between a plurality of suspended, substantially parallel composite electrodes 26. Although a vertical flow of oil well production 12 is preferred, the invention is not limited thereto. Oil flow through treater or dehydrator 10 is typically 50 barrels of oil per day per square foot of electrode 26 at the maximum cross-section of treater 10. However, oil flow can vary from as low as 5 barrels of oil per day per square foot for heavy oils to in excess of 100 barrels of oil per day per square foot of electrode for light oil at high temperatures.

Composite electrodes 26 are fabricated of laminar construction having a substantially planar electrically nonconductive first member 28 with a substantially planar electrically conductive second member 30 laminarly disposed on one planar surface thereof. The planar dimensions of second member 30 are typically less than the planar dimensions of first member 28 resulting in a substantially centrally located second member 30 which from a perspective normal to second member 30 is an electrically conductive central region formed by second member 30 surrounded by an electrically nonconductive region formed by a part of first member 28. In a preferred embodiment, adjacent composite electrodes 26 are oriented in the same way such that there is always an electrically nonconductive first member 28 between adjacent electrically conductive members 30. Due to the composite electrode construction, arcing is minimized and self extinguishing.

With a non-modulated high voltage applied to the conductive central region formed by member 30, the electric field formed between any two adjacent composite electrodes 26 of the plurality of composite electrodes 26 increases substantially from the outer perimeter 32 of the non-conductive first member 28 of composite electrode 26 to the electric field gradient established between conductive second member 30. The electric field gradient is greatest across the conductive central region 30. The various electric field gradients established between the various regions of two adjacent composite electrodes 26 is discussed in greater detail hereinbelow. Utilizing composite electrodes 26 designed in accordance with the present invention obviates the need to modulate the voltage applied to the electrodes. Furthermore, a voltage control system capable of detecting and quenching arcing is also not necessary.

Figure 3:
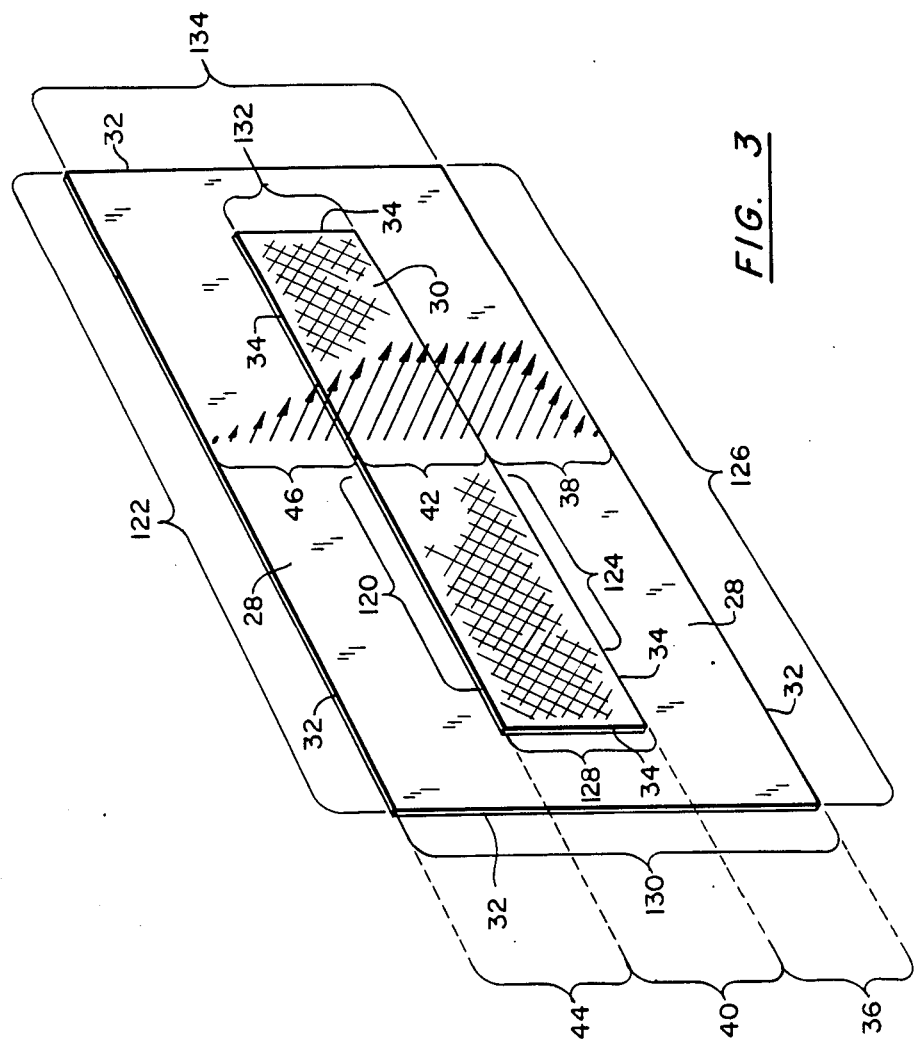
FIG. 3 is a perspective view of a composite electrode.
Figure 4:
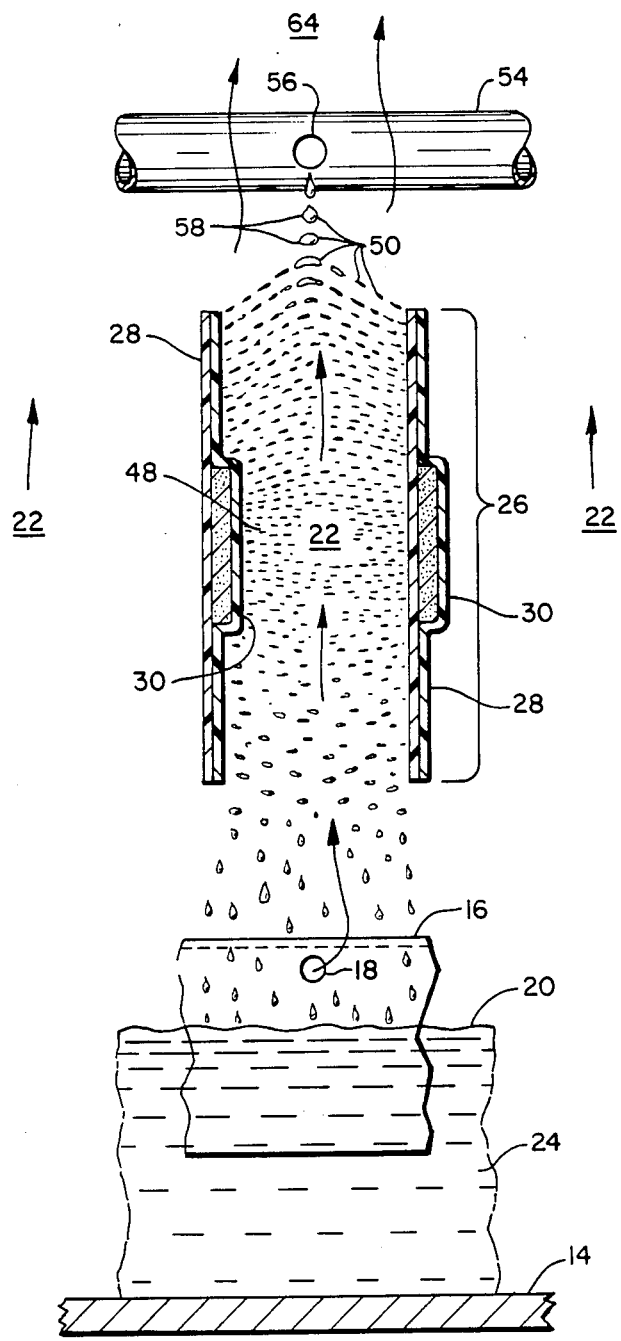
FIG. 4 is a cross-section of two adjacent composite electrodes, having a passageway for the emulsion therebetween.

The following description of the preferred embodiment of an oil dehydration process is best understood with reference to FIGS. 1, 3 and 4. As emulsion 22 flows upwardly over composite electrodes 26, relative to the direction of flow of emulsion 22, it is first subjected to an increasing electric field gradient represented by vectors 38 generated in area 36, the uniform high intensity electric field gradient represented by vectors 42 generated in area 40 and subsequently to a decreasing electric field gradient represented by vectors 46 generated in area 44. As emulsion 22 enters the increasing electric field gradient of area 36, the larger, less stable disbursed brine droplets that comprise oil-brine emulsion 22 are coalesced into yet larger droplets which are then of sufficient size to gravitate against the flow of emulsion 22 coalesce into interface 20 becoming a part of the body of water 24 for subsequent removal from the bottom of dehydrator 10 through water outlet 68.

As the somewhat dehydrated or reduced emulsion 22 continues upward through the increasing electric field gradient 38 generated in area 36, smaller and smaller disbursed brine droplets that comprise oil-brine emulsion 22 are coalesced into yet larger droplets, some of which are then of sufficient size to gravitate against the upward flow of emulsion 22, continuing to coalesce as they gravitate down through increasing electric field gradient 38, which relative to the gravitating coalesced brine droplets is a decreasing electric field gradient that enhances further coalescence of the larger brine droplets. The gravitating brine droplets coalesce into interface 20 joining body of water 24.

The somewhat dehydrated or reduced emulsion 22 containing the smaller, more stable disbursed brine droplets, continue upward into the stronger, uniform electric field gradient generated in area 40 as represented by vectors 42 established between the electrically conductive second member 30 of one composite electrode 26 and electrically nonconductive first member 28 of an adjacent composite electrode 26. The smaller brine droplets are coalesced by the strong, uniform electric field gradient 42 into a mean droplet size 48 determined by the electric field gradient 42. These droplets of brine and disbursed dilution water, particularly those attaining the mean droplet size 48, are sufficiently large to be influenced by gravity and the electroconvective currents to migrate or gravitate against the upward flow of emulsion 22. A majority of the coalesced droplets that attain the mean droplet size 48 migrate back into increasing electric field 38, which relative to the gravitating coalesced brine droplets, is a decreasing electric field gradient that further enhances coalescence of the gravitating brine droplets. The gravitating brine droplets coalesce into interface 20 joining body of water 24.

A minority of the coalesced droplets that attain the mean droplet size 48 in area 40, along with the very small brine droplets not reached by the electric field generated in area 40, are carried upward with emulsion 22 into area 44 having a decreasing electric field gradient represented by vectors 46, the decreasing electric field gradient in the direction of flow of emulsion 22. Decreasing electric field gradient 46 is established between regions of electrically non-conductive first member 28 on two adjacent composite electrodes 26. Area 44, having decreasing electric field gradient 46, induces further coalescence of the droplets that attain the mean droplet size 48 thereby combining with some of the smaller brine droplets carried along with the flow of emulsion 22 or other of the mean droplet size 48 droplets carried along with the flow of emulsion 22. The larger than mean size brine droplets so formed then gravitate against the flow of emulsion 22 back into area 40, where they are subjected to a uniform high intensity electric field gradient 42, which shears the larger than mean size 48 droplets into smaller droplets, thereby redisbursing the droplets in emulsion 22. Some of the redisbursed brine droplets are the mean droplet size 48 and gravitate downward against the flow of emulsion 22, into electric field 36, continuing coalescence, thence gravitating to and coalescing into interface 20 joining body of water 24. A minority of the redisbursed mean droplet size 48 brine droplets and the smaller redisbursed brine droplets are carried, again, into area 40. As this process repeats, a gradual downward migration of brine droplets occurs as the brine is separated from emulsion 22. The downward velocity of migration of droplets is controlled by the relative electric field gradients between area 40 and areas 44 and 36.

Simultaneously, dilution water 50 is introduced into housing 14 of oil treater or dehydrator 10 through dilution water inlet pipe 52. Dilution water 50 may be fresh water or less salty water than is being removed through water outlet 68. Dilution water 50 received from inlet pipe 52 is distributed along the length of housing 14 and released into partially dehydrated emulsion 22 above composite electrodes 26 through distribution header 54 having orifices 56. Dilution water 50 enters emulsion 22 as large droplets 58, typically larger than mean droplet size 48, and therefore rapidly gravitate against the upward flow of emulsion 22 into decreasing electric field gradient 46 of electric field 44. The downward gravitating larger dilution water 50 water droplets 58 are subjected to an increasing electric field gradient in area 44 due to their counterflow to emulsion 22. The larger water droplets 58, when subjected to the electric field genrated in area 44, are sheared into smaller water droplets 60, which are disbursed in the partially dehydrated emulsion 22 and begin to contact, coalesce and dilute any brine droplets that have progressed to area 44. The coalesced droplets in electrostatic field 44 gravitate against the flow of emulsion 22 into the substantially uniform high intensity electric field gradient 42 of area 40 where they become thoroughly disbursed. Droplets are repeatedly coalesced, dispursed and recoalesed with the brine in emulsion 22 between adjacent composite electrodes 26 as they migrate or gravitate downward through area 40 thence area 36 against the flow of emulsion 22 eventually coalescing into interface 20 joining body of water 24.

In this manner, the brine remaining in emulsion 22 in area 44 is diluted by dilution water 50, thence the diluted brine is removed from emulsion 22 in a highly efficient manner equivalent to an efficient multi-stage mixer/coalescer/separator due to the combination of intensive mixing and countercurrent dilution water flow. When combined with removal of relatively large brine droplets from oil well production 12 in the region of the electric field generated in area 36 and the removal of smaller droplets of brine coalesced in the electric field generated in area 40, this combination of brine removal dehydrates oil 64 which collects in the upper region of housing 14 of dehydrator 10 and is removed, therefrom, through oil outlet 66.

This sequence of adding dilution water, disbursing, mixing, coalescing and settling, is repeated ad infinitum as the fluid moves through electrostatic fields allowing the polarized fluid to gravitate downward and producing numerous countercurrent mixing, shearing, diluting and coalescing stages. When used in this counterflow configuration, dehydrator 10, designed in accordance with the present invention, becomes an extremely efficient, multi-stage, economical mixer/separator for removing, in the preferred embodiment, brine from oil well production.

Figure 2:
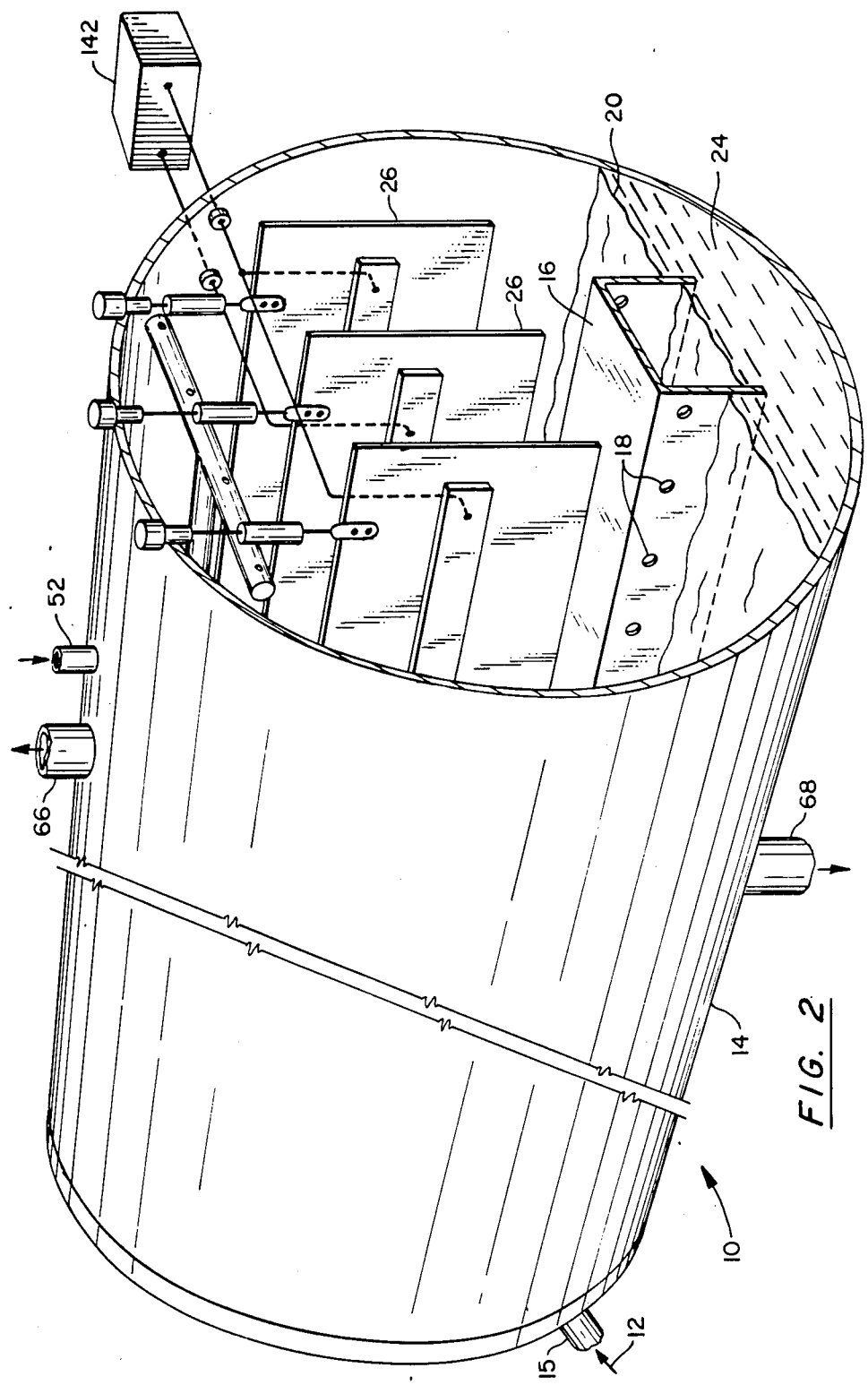
FIG. 2 is a perspective view, partly in section, of a dehydrator similar to that shown in FIG. 1, wherein composite electrodes extend longitudinally with the vessel.

As best seen in FIG. 1, oil well production that enters housing 14 and is distributed through spreader 16 and orifices 18 flows upwardly through parallel passageways formed between pairs of composite electrodes 26, which are in the preferred embodiment vertically suspended and typically extending transverse to the longitudinal access of housing 14. Alternatively, composite electrodes 26 may extend longitudinally with housing 14 as depicted in FIG. 2. The support for composite electrodes 26 includes insulated hangers 72, which extend upwardly from a first set of racks 74 that support composite electrodes 26 having one polarity charge and insulated hangers 76 which extend upwardly from a second set of racks 78 that support the remaining composite electrodes 26. Insulated hangers 72 and 76 are designed to bear the load of racks 74 and 76, respectively, as well as one half of composite electrodes 26.

By way of example, a dehydrator or treater 10 designed in accordance with the the present invention, receiving crude oil having a 0.5% by volume brine (200,000 PPM salt) disbursed in the oil continuous emulsion with 1.0% volume countercurrent dilution (fresh water) flow, a salt removal of 99.93% was obtained. This is equivalent to reducing the salt content from 400 pounds per 1,000 barrels of oil to 0.3 pounds salt per 1,000 barrels of oil. The viscosity of the oil phase was 53 SSU's at the testing temperature and the flow rate of oil was equivalent to 300 barrels of oil per day per square foot of electrode surface. The voltage applied to the conductive central region 30 of composite electrode 26 was 45,000 volts with an electrode spacing of 3 inches.

To establish what may be considered a single electric field with regions of varying electric field gradient or a multiplicity of electric fields, some having a constant field gradient and others a varying field gradient, a plurality of composite electrodes 26 is employed. In a typical composite electrode 26 is laminarly constructed comprising electrically nonconductive first member 28 made of fiberglass and electrically conductive second member 30 is a graphite fiber. A composite electrode 26 may be manufactured by a pultrusion process best understood with reference to FIG. 7.

Figure 7:
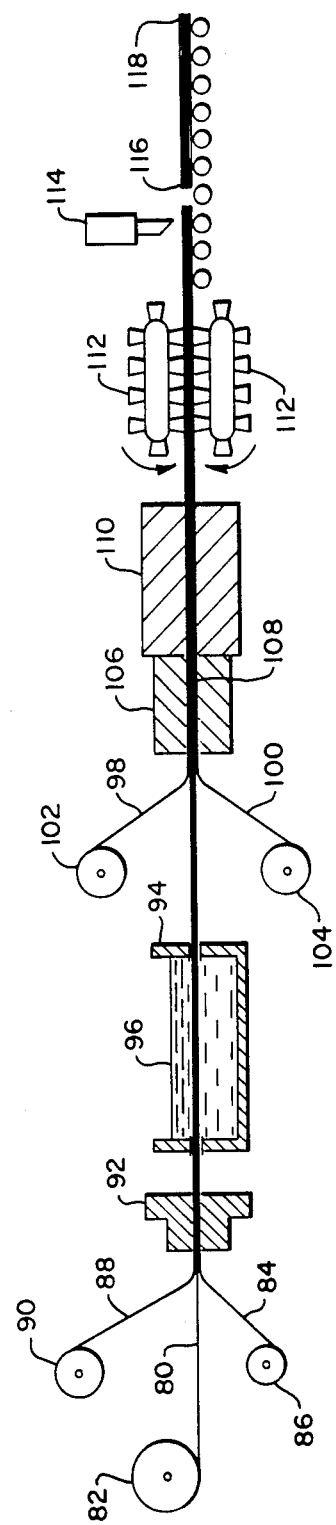
FIG. 7 is a schematic diagram disclosing the pultrusion process by which a composite electrode may be manufactured.

FIG. 7 shows a typical continuous pultrusion operation. Continuous-strand rovings 80 of fiberglass are pulled from roving creel 82 and a mat 84 of fiberglass is pulled from creel 86. A continuous strip of electrically conductive material 88, such as graphite fiber, is pulled from creel 90. The width of electrically conductive material 88 is substantially less than the width of the continuous strand rovings of fiberglass 80 or mat 84 of fiberglass. The layered electrically conductive material 88, continuous strand rovings 80, and mat 84 are passed through a guide 92, thence through a thermal setting resin bath 94 containing a resin impregnator 96 in which the fiberglass is thoroughly wetted.

After the layers of fiberglass and graphite pass through resin bath 94, an upper surface layer 98 and lower surface layer 100 from creels 102 and 104, respectively, may be added. Surface layers 98 and 100 may be fiberglass. After the surface material is added, the wetted material enters preformer 106 that shapes layers 98, 88, 80, 84 and 100 into its approximate final shape. The continuous ribbon-like laminar strand 108, comprised of layers 98, 88, 80, 84 and 100, is then pulled through forming and curing die 110 by pull blocks 112. Strand 108 emerges from forming and curing die 110 in its final shape and is cooled in line by air or water and then cut to predetermined lengths by cutoff saw 114. After being cut to predetermined lengths, since the strip of electrically conductive material 88 extends the full length of each severed fiberglass section, the electrically conductive material 88 is removed from the edges cut by cutoff saw 114, such as by a grinding process. Removing conductive material 88 concomitantly necessitates removing upper surface layer 98. Upper surface layer 98 is restored such as by painting the area with an epoxy resin. Removing the electrically conductive material 88 within approximately 3 or 4 inches of the cutoff edges has been found to be adequate to prevent arcing or distorted electric fields around the ends of composite electrodes 26.

A plurality of uniformly spaced, substantially parallel composite electrodes 26 are configured in dehydrator 10 with a source of voltage connected to electrically conductive second member 31 of each electrode 26. The conductivity of electrically conductive second member 30 instantly transfers charge evenly thereover. An electric field is thereby established between any two adjacent electrodes 26. An electric field having a uniform gradient the magnitude of which is dependent on the spacing between adjacent electrodes 26 and the voltage applied thereto is established between electrically conductive second member 30 of an electrode 26 and electrically nonconductive first member 28 of an adjacent composite electrode 26. It is this area of the electrode that establishes the strong, uniform electric field gradient that disburses an aqueous phase into the organic phase and mixes the two phases together.

Electrically non-conductive first member 28, although an insulating material, such as fiberglass, readily accepts and retains a surface charge. Thus, an electric field will also exist between the electrically nonconductive first member 28 in regions 36 and 44 of a composite electrode 26 and the electrically nonconductive first member 28 of an adjacent composite electrodes 26. The charging of an insulating material is predominantly a surface phenomenon. However, the rate of transfer of charge along the surface of an insulator and the rate of loss of charge to the surrounding environment is related to the charge relaxation time constant of the insulator, defined by the equation:

$$T = e/d$$

where T is the charge relaxation time constant, e is the permittivity of the insulator, and d is the conductivity of the insulator. A material with a large charge relaxation time constant may transmit a charge along its surface relatively slowly but is less likely to discharge conductive second member 30 than a material with a smaller charge relaxation time constant. Therefore, insulating materials with a large charge relaxation time constant are probably best suited for most applications. A typical composite electrode 26 may be 12 feet long and 30 inches high. The graphite fiber forming conductive second member 30 may be 8 inches wide or less, approximately centered from top to bottom and extending along the 12 foot length to within approximately 3 to 4 inches of each end.

Thus, an electric field is established in area 44 between the non-conductive portions of adjacent electrodes 26. Between edge 120 of conductive central region 30 and edge 122 of electrode 26, the electric field gradient decreases from the strong electric field gradient between conductive central region 30 of two adjacent electrodes, represented schematically by vectors 42. This electric field gradient is represented schematically by vectors 46. Edge 120, being the line of contact with the conductive central region 30, is the source of charge for this non-conductive portion of electrode 26. The surface charge, under operating conditions, is not uniform over the surface area of the insulating, non-conductive material 28 of electrode 26. The charge decreases with increasing distance from edge 120 of conductive central region 30. The precise decrease is dependent on several factors, including the charge relaxation time constant of the insulating material, the conductivity of the organic phase of oil well production 12, and the volume fraction of the disbursed aqueous phase in the emulsion. An increase in either of the latter two parameters increases the rate of loss of charge from the insulating material and increases the rate of change in charge density with increasing distance from edge 120.

A similar electric field in area 36 is established between edge 124 of conductive second member 30 and edge 126 of electrode 26. The electric field gradient decreases from the strong electric field gradient between conductive second member 30 of two adjacent electrodes 26, represented by vectors 124, to a minimum electrical field gradient at the edge 126 of electrode 26. This electric field gradient is represented schematically by vectors 38.

In some applications, it may be desirable to insure that the potential on the non-conductive portion of electrode 26 decreases to zero at the edge thereof. This can be accomplished by grounding the end of a nonconductive section farthest removed from contact with conductive second member 30. It would be most desirable to have the potential on the non-conductive portion of electrode 26 to drop to near zero in the direction of flow of emulsion 22.

A similar electric field is established between edge 128 of conductive second member 30 and edge 130 of electrode 26, as well as between edge 132 of conductive second member 30 and edge 134 of electrode 26. This decrease in electrical field between the gradient at edge 128 and near zero at the edges 130 and 134 of electrode 26 is greater due to the typically shorter physical distance.

Removing the strip of electrically conductive material 88 from edges 130 and 134 of electrode 26, thereby forming electrically conductive second member 30 of electrode 26, assures there will be no arcing around the ends of electrodes 26 when an electric field is established between two adjacent composite electrodes 26.

Thus, with a relatively non-conductive oil well production 12 surrounding the plurality of composite electrodes 26, very little energy is required to sustain a charge on electrodes 26. Electrically non-conductive first member 28 has sufficient charge transport capability to supply and maintain the necessary charge under normal operating conditions to establish the above-described electric field gradients. Due to the charge relaxation time constant, should local conditions between adjacent electrodes result in shorting or arcing, such as may be caused by a high water content emulsion or excessive dilution water, the charge will be dissipated from the surrounding surface area of an electrode faster than it can be replaced. A decreased surface charge occurs only in the area of the arc, thereby quenching the arc and limiting the power consumed by the arc, and further ceasing the mixing, dispersing, coalescing process only for a short duration and only in the immediate region of the arc, as the voltage on the remainder of electrode 26 is unaffected due to the charge relaxation time constant.

Thus, where the dielectric strength of the emulsion between adjacent electrodes 26 is sufficient, the charge transport characteristics of electrode 26 maintain the electric field and the mixing, dispersing, coalescing process continues. Therefore, composite grids 26 have an inherent current regulating characteristic that reduces the tendency for arcing and, furthermore, suppresses sustained arcing should an arc occur. For this reason, a dehydrator 10 designed in accordance with the present invention, can be used to dehydrate oil well production having higher water content, whether the water is initially supplied from the oil well production or is added as dilution water than a dehydrator with conductive electrode plates. In addition, the dehydrator can operate at a higher voltage in the range of 42,000 volts to 50,000 volts with closer spaced electrodes, as compared to the prior art of typical 23,500 on electrodes with 6 inch spacing. No external modulation or regulation of the power supply is required. The higher voltage can be used due to the inherent reduced tendency to arc. The combination of higher voltage and closer spacing provides a much higher electric field gradient between conductive second member 30 and an adjacent composite electrode 26, thereby decreasing mean droplet size 48 and enhancing the dispersing and mixing processes.

As shown in FIGS. 1, 2, and 4 through 6, the conductive second members of adjacent electrodes 26 are, in a preferred embodiment, on the same side of first member 28, such that there is always an insulating layer between the conductive graphite fibers of adjacent electrodes 26. In a preferred embodiment, electrode 26 is constructed of two layers of insulating material such as fiberglass with a conductive central region, such as graphite fiber, sandwiched therebetween.

Some resins will surface wet with water in emulsion 22. Surface wetting is water adhering to the surface of composite electrode 26. Surface wetting is undesirable, as the water increases the conductivity of the electrode surface, thereby changing not only the electric field gradient but also the charge relaxation time constant. The change in electric field gradient effects the entire mixing, dispersing, coalescing process. The change in relaxation time constant can provide a greater charge during arcing, thereby collapsing the electric field over a greater area and disrupting the mixing, dispersing, coalescing process. Thus, insulators that do not surface wet are desirable.

Composite electrodes 26 may contain ribs 70, which provide the dual function of providing structural strength as well as providing areas of greater electric field gradient due to the closer physical spacing between adjacent electrodes. Ribs would be particularly useful to disperse the dilution water droplets and, therefore, are useful in second member 30 and the upper portion of composite electrode 26 in the regions of electric fields generated in areas 40 and 44.

Figure 5:
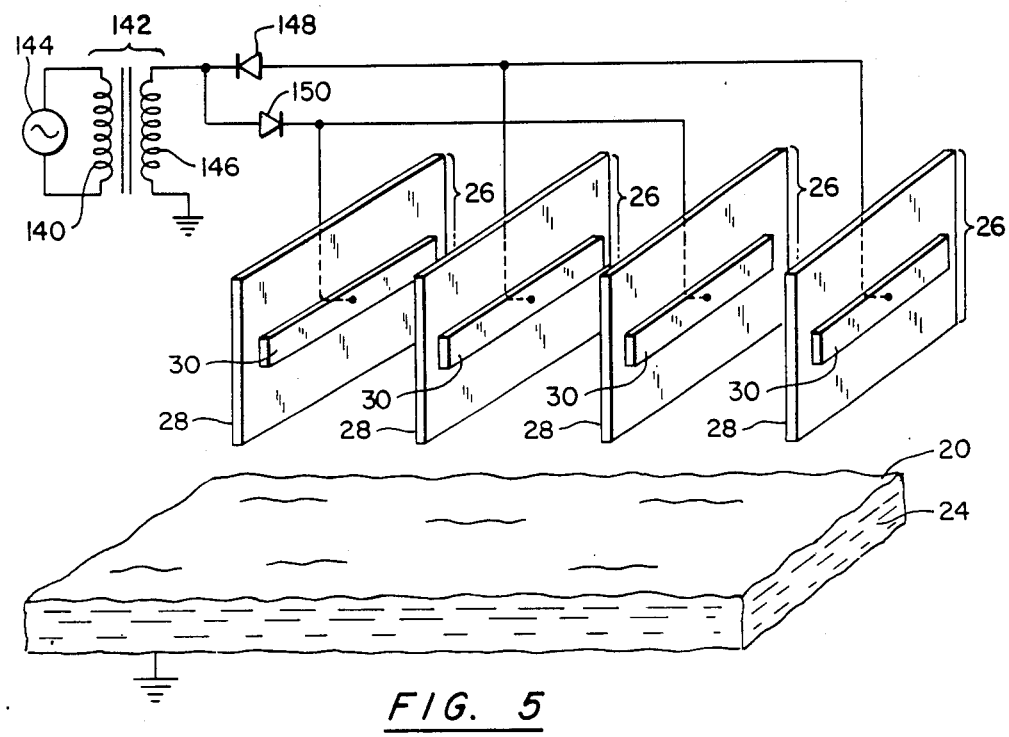
FIG. 5 is a perspective view of two pairs of composite electrodes, forming passageways for the emulsion therebetween, disclosing one manner in which voltage may be applied thereto.
Figure 6:
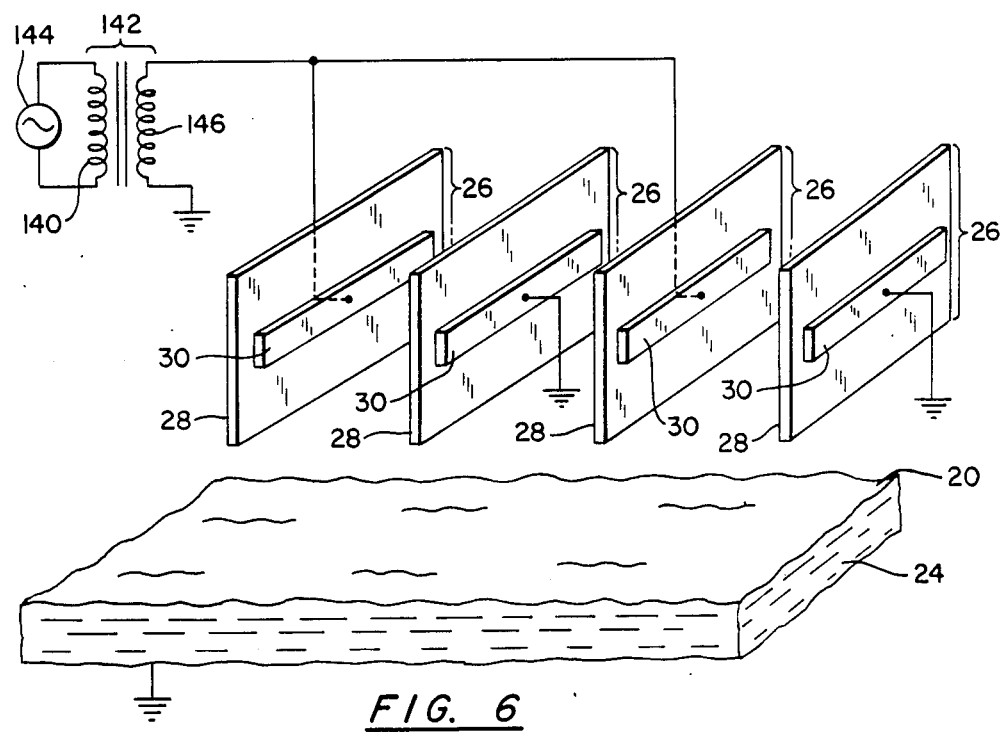
FIG. 6 is a perspective view of two pairs of composite electrodes, forming passageways for the emulsion therebetween, disclosing an alternate manner in which voltage may be applied thereto.

As best seen in FIGS. 5 and 6, a voltage may be applied to the plurality of composite electrodes 26 in several ways. As illustrated in FIG. 5, the primary winding 140 of step-up transformer 142 is connected to a power source 144. The voltage induced in the secondary winding 146 is connected by one side of secondary winding 146 to electrically conductive second member 30 of each composite electrode 26. The other side of secondary winding 146 is grounded. The secondary winding 146 is connected to composite electrodes 26 through two rectifiers, such as anti-parallel diodes 148 and 150. Diode 148 is connected between secondary winding 146 and half of the composite electrodes 26, and diode 150 is connected between secondary winding 146 and the remaining half of the composite electrodes 26, such that every other composite electrode 26 is connected to the same diode. In this manner, each adjacent pair of composite electrodes 26 is connected to different rectifiers and, therefore, the pair of composite electrodes 26 is oppositely charged. Body of water 24 is grounded with respect to both oppositely charged composite electrodes 26.

Alternatively, as illustrated in FIG. 6, the rectifiers may be omitted and one side of secondary winding 146 connected to every other composite electrode 26, while the other side of secondary winding 146 is grounded and connected to the remaining composite electrodes 26. In this manner, one composite electrode 26 in each adjacent pair of composite electrodes 26 is charged with an alternating current voltage, while the other composite electrode in the adjacent pair is grounded.

The present invention can be used in any liquid-liquid exchange system in which effective mixing and separation of the immiscible polar and non-polar solutions is required. These systems include, but are not limited to, the recovery of those products that can be dissolved out of their ore by weak acids, such as those systems employed in the recovery of uranium and copper.

One representative system in which the present invention can be used is the hydrometallurgical mining system of Prestridge, U.S. Pat. No. 4,120,769. In this system, three fluid circuits are disclosed for the illustration of transferring copper from ore into a final circuit for an electrowinning process to complete the recovery. The first circuit contains a weak acid (polar solution) in the extractor loop to dissolve copper from ore. This weak acid of the extractor loop is thereby made pregnant with the copper. The second loop contains a selective ion exchange compound in a non-polar organic carrier, which is engineered to remove the copper from the pregnant weak acid. Next, the ion exchange compound loaded with copper is mixed with an acid strong enough for the hydrogen ions to displace the copper from the loaded ion exchange compound and regenerate the compound with the hydrogen ions. The copper can then be removed from the strong acid by electrowinning process.

We claim:

1. Apparatus for dehydrating oil, comprising
   a. a housing;
   b. inlet means for passing oil well production having a brine content into the housing;
   c. inlet means for passing relatively fresh water into the housing;
   d. outlet means for removing dehydrated oil from the housing;
   e. outlet means for removing brine-diluted water from the housing;
   f. a plurality of substantially parallel plates forming passageways therebetween for passage of oil well production, each plate having a laminar construction comprising a substantially planar electrically nonconductive first member and a substantially planar electrically conductive second member wherein the planar dimensions of the second member are less than the planar dimensions of the first member resulting in a centrally located second member which from a perspective on the side of the first member is an electrically conductive central region surrounded by an electrically nonconductive region;
   g. means for applying a non-modulated voltage to the electrically conductive second member of each plate thereby establishing an electric field in the passageway between adjacent plates;
   h. distributor means mounted within the housing beneath the plurality of plates for receiving oil well production from the oil well production inlet means and for distributing the oil well production throughout the lower region of the housing so as to enter the electric field established between adjacent electrical plates;
   i. distributor means mounted within the housing above the plurality of plates for receiving relatively fresh water from the fresh water inlet means and for distributing relatively fresh water in relatively large drops throughout the upper region of the housing such that the relatively large droplets of relatively fresh water enter the electric field in countercurrent flow to the oil well production, whereby as the oil well production enters the electric field established between two adjacent plates, said oil well production, in the direction of flow, is subjected to an increasing electric field gradient in passing a first nonconductive portion of the electrical plates, thence is subjected to a uniform high electric field gradient in passing a conductive central portion of the electrical plates and thence is subjected to a decreasing electric field in passing a second nonconductive portion of the electrical plates, as the relatively fresh water passes in countercurrent flow to the oil well production through the electric field between two adjacent plates, said water is subjected to an increasing electric filed gradient in passing the second nonconductive portion of the electrical plates wherein large water droplets are sheared, thence said water is subjected to a uniform high electric field where smaller water droplets are coalesced and larger water droplets are sheared and the water is mixed with the oil well production thereby increasing the contact of water with brine, the larger droplets of diluted brine thence being subjected to a decreasing electric field gradient in passing the first nonconductive portion of the electrical plates.

2. Apparatus as recited in claim 1 wherein adjacent plates are oriented in the same way such that there is an electrically nonconductive first member between adjacent electrically conductive members, whereby arcing is minimized and self extinguishing.

3. Apparatus as recited in claim 1 wherein the electrical plates are vertically oriented.

4. Apparatus as recited in claim 1 further comprising a transformer interposed between the plurality of electrical plates and a power source whereby the voltage applied to the plurality of electrical plates is greater than the voltage of the source.

5. Apparatus as recited in claim 1 further comprising:
 a. orifice means in the fresh water distributing means for providing uniform distribution of the relatively fresh water along the fresh water distributing means; and
 b. orifice means in the oil well production distributing means for providing uniform distribution of the oil well production along the oil well production distributing means.

6. Apparatus as recited in claim 1 further comprising insulated support means for suspending each of the plurality of plates from the housing.

7. Apparatus as recited in claim 1 in which the electrical plates are connected to an energizing source in an arrangement to oppositely charge the adjacent electrode plates.

8. Apparatus as recited in claim 1 in which the electrical plates are connected to an energizing source in an arrangement that charges every other electrode with an AC potential and the remaining electrodes are grounded.

9. Apparatus as recited in claim 1 wherein the nonconductive first member is fabricated of fiberglass.

10. Apparatus as recited in claim 1 wherein the conductive second member is fabricated of graphite fiber.

* * * * *